Aug. 27, 1968          R. ELGNER          3,398,701
DEVICE FOR FORMING CRESCENT ROLLS AND SIMILAR BAKED GOODS
Filed June 6, 1966                    2 Sheets-Sheet 1
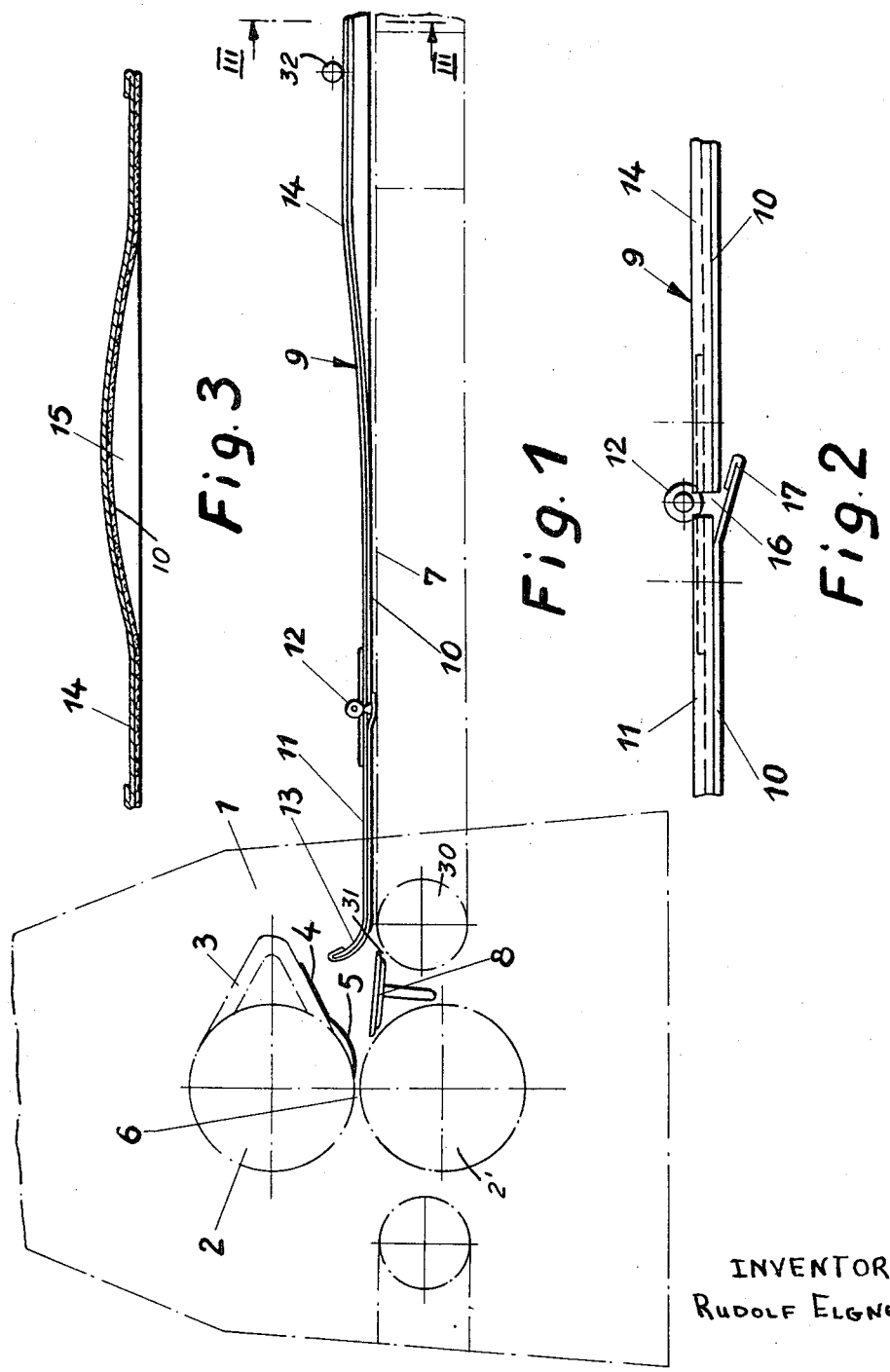
INVENTOR
RUDOLF ELGNER
BY Hans and Nydick
ATTORNEYS Aug. 27, 1968  R. ELGNER  3,398,701
DEVICE FOR FORMING CRESCENT ROLLS AND SIMILAR BAKED GOODS
Filed June 6, 1966  2 Sheets-Sheet 2
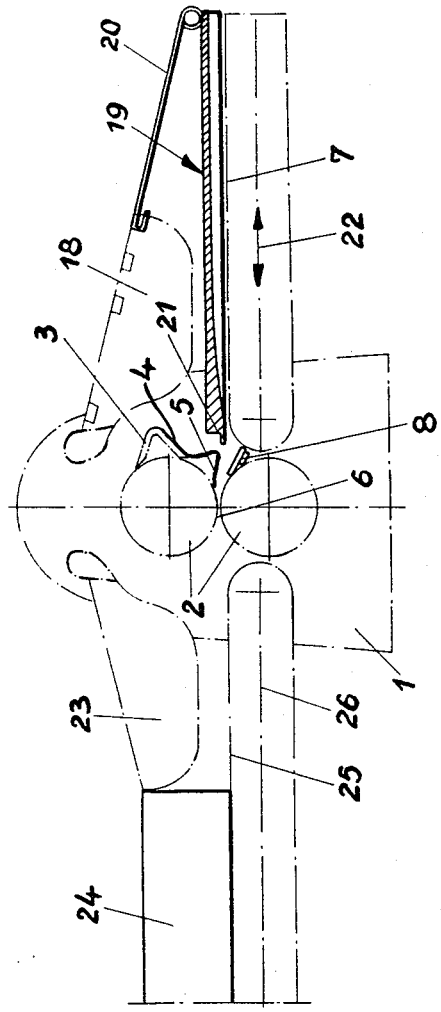
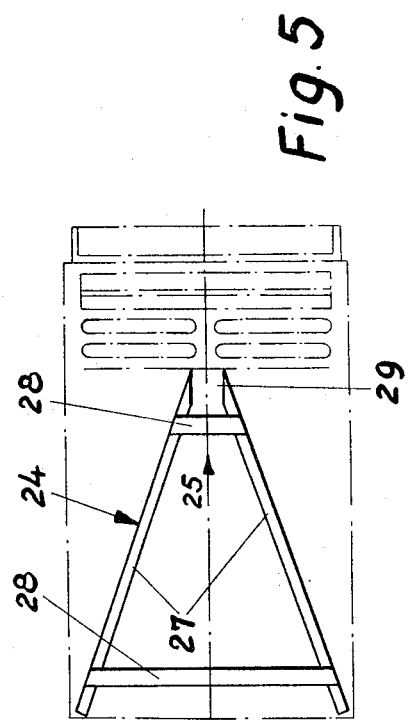
INVENTOR
RUDOLF ELGNER
BY Hame and Nydick
ATTORNEYS

United States Patent Office 3,398,701
Patented Aug. 27, 1968

3,398,701
DEVICE FOR FORMING CRESCENT ROLLS AND SIMILAR BAKED GOODS
Rudolf Elgner, Markt Einersheim, Germany, assignor to A. Fritsch KG., Markt Einersheim, Germany, a company of Germany
Filed June 6, 1966, Ser. No. 555,331
Claims priority, application Germany, June 30, 1965, F 28,326
9 Claims. (Cl. 107—9)

ABSTRACT OF THE DISCLOSURE

There is disclosed a dough-working device for first rolling out dough in the form of a layer and then tightly rolling up the layer to bake crescent rolls therefrom. The device comprises two coacting pressure rollers between which the piece of dough is rolled out to form a layer therefrom. The dough layer emerging from the rolling gap between the two rollers is then guided between a conveyor traveling along a straight path and a rigid rolling strip mounted above the conveyor generally parallel thereto and spaced apart therefrom whereby the layer of dough is first folded over and then tightly rolled up. The lengthwise midportion of the rolling strip is preferably concavely curved in crosswise direction to enlarge the cross-section of the mid portion of the rolled up dough.

---

The present invention relates to a device for forming crescent rolls ("Hörnchen" in German and "croissant" in French) and similar baked goods, and more particularly to a device of this kind designed as an accessory for or as part of a dough-rolling device including a pair of superimposed pressure rollers coacting with stripping means, a conveyor table disposed posteriorly of the pressure rollers and a rolling plate or strip disposed above the conveyor table for rolling dough between the rolling plate or strip and the table.

The rolling of crescent rolls and similar baked goods in conventional dough-rolling devices presents difficulties. Such devices are generally incapable of rolling a layer of dough tightly enough to produce the desired number of rolled layers. Accordingly, it is customary in practice in the bakery industry to produce baked goods of the kind here involved by means of special devices which are independent of a dough-rolling device or machine.

It is a broad object of the present invention to provide a novel and improved device for forming crescent rolls and similar baked goods in a fully satisfactory manner as part of the operation of a dough-rolling machine, thereby eliminating the need for separate operations, namely, rolling out the dough and forming the desired baked goods from the rolled-out dough.

The aforementioned object, feature and advantage, and other objects, features and advantages, which will be pointed out hereinafter, are attained by providing a rolling strip which extends from the discharge side of the pressure rollers closely thereto and is disposed substantially in planar alignment with the scraping edge of a stripper coacting with the upper one of the pressure rollers. As a result, the dough emerging from the pressure rollers is directed by the scraping edge of the stripper toward and between the rolling strip and a conveyor table disposed below the rolling strip parallel thereto, whereby the dough which has been rolled out between the pressure rollers is first folded over and then tightly rolled up.

The rearward part of the rolling strip preferably has an outwardly curved lengthwise midportion so that the crescent rolls, when leaving the rolling strip at the end thereof, are substantially thicker around the midportion than at the end portions.

The rolling strip is preferably divided into a front part adjacent to the pressure rollers and a rear part hinged to the front part. The rear part is fixedly mounted in reference to the conveyor table, while the front part can pivot upwardly. This has the advantage that the front part of the rolling strip, which, as previously stated, is disposed substantially in planar alignment with the scraping edge of the stripper, can yield to the upward pressure of the dough so that the dough will be safely folded over and subsequently rolled.

The gap caused by the hinge connection between the front part and the rear part of the rolling strip is preferably bridged at the bottom side of the strip by an extension on the front part or the rear part of the strip and is covered with a suitable soft material, such as a fabric, for instance, linen, cotton or felt. Such bridging and covering of the gap in the rolling strip assures that an already partly formed crescent roll will not be damaged when passing the gap. It may also be advantageous to cover the entire bottom surface, or at least the entire front part, of the rolling strip with a suitable fabric or other soft material.

According to another aspect of the invention a one-piece rolling strip is secured to a guard shield mounted on the discharge side of the pressure rollers.

A further aspect of the invention resides in arranging the conveyor table lengthwise displaceable in reference to the rolling strip between a position substantially in engagement with the lower pressure roller and a position spaced apart therefrom. Such displacement can be effected by a suitable and conventional setting means, such as a cam means.

Extensive tests have shown that arranging the rolling strip so that its receiving end is closely adjacent to the discharge side of the pressure rollers results in an accurate and rapid forming of the crescent rolls and similar baked goods. It has also been found that placing the receiving end of the conveyor table closely adjacent to the lower pressure roller often makes unnecessary a stripper coacting with the lower pressure roller.

In the accompanying drawings, several preferred embodiments of the invention are shown by way of illustration, and not by way of limitation.

In the drawings:

FIG. 1 is a diagrammatic elevational side view of a crescent roll-forming device according to the invention in association with a dough-rolling machine;

FIG. 2 is a fragmentary detail view of the rolling strip of the device on an enlarged scale;

FIG. 3 is a cross section of the rolling strip taken on line III—III of FIG. 1;

FIG. 4 is an elevational side view of a modification of the crescent roll-forming device also associated with a dough-rolling machine; and FIG. 5 is a plan view upon the feeding side of the machine according to FIG. 4.

Referring now to the figures more in detail, the device as exemplified in FIGS. 1, 2 and 3 comprises a mounting frame 1 supporting superimposed pressure rollers 2 and 2'. The rotational speed of these rollers may be controllable by means well known for the purpose.

The upper roller coacts with an angular stripper 4 secured to a suitably mounted bracket 3. The stripper has an extension 5 made, for instance, of sheet metal, the scraping edge of which is located just at the discharge end of gap 6 between rollers 2 and 2'. A conveyor table 7 in the form of an endless conveyor band guided about a roller 30 is disposed posteriorly of rollers 2 and 2'; that is, on the discharge side thereof. The gap 31 between the receiving end of conveyor 7 at guide roller 30 and the lower pressure roller 2' is substantially bridged by a lower stripper 8 which is suitably mounted in the illustrated position.

Conveyor 7 coacts with a substantially rigid rolling strip 9 made of any material suitable for the purpose. The bottom side of the strip, that is, the side facing the conveyor, is preferably covered with a suitable soft layer 10, such as a felt layer. The strip has a front part 11 and a rear part 14 joined by a suitable hinge 12. Rear part 14 is fixedly mounted in reference to conveyor 7, but front part 11 can pivot upwardly. The receiving end 13 of strip 9 is turned upwardly, as is shown in FIG. 1, to facilitate the entry of dough.

The rear part 14 of strip 9 has a lengthwise midportion 15 which is concavely curved in reference to the conveyor to provide space for passage of a thicker layer of dough than at the side portions of the strip to form the midportions of the crescent rolls, which, as is well known, should have an enlarged cross section. A weight or a suitable conventional pressure means as indicated at 32 may be applied to the curved midportion of strip 9 to flatten the same somewhat when it is desired to produce slimmer rolls.

A gap 16 caused between the two parts 11 and 14 of the rolling strip 9 by the mounting of hinge 12 is preferably bridged by an extension 17 of front part 11. This extension is advantageously also covered with fabric or other soft material so that a partly formed roll will not be damaged when it passes the gap under rolling pressure.

The device shown in FIGS. 4 and 5 corresponds in principle to the device shown in FIGS. 1, 2 and 3. According to FIGS. 4 and 5, a guard shield 18 is stationarily mounted by suitable conventional mounting means on the discharge side of pressure rollers 2. This shield is used to support a substantially rigid rolling plate or strip 19. Strip 19 has in cross-section a concavely curved lengthwise midportion similar to strip 9 (see FIG. 3) which is further held by struts 20. The receiving end 21 of rolling strip 19 again is disposed close to rolling gap 6 and the scraping edge of stripper extension 5, so that the scraping end and the receiving end of the rolling strip are substantially in planar alignment.

Conveyor 7 may be lengthwise displaceable in either direction, as is indicated by a two-headed arrow 22. Setting means suitable for the purpose are not shown in detail, but are well known in the art.

A second guard shield 23 also stationarily mounted on suitable conventional mounting means is provided on the feed side of rollers 2. This guard shield is used to support a guide frame 24. The frame is formed by guide tracks 27 joined by cross bars 28 and rests upon the upper or feed run 25 of an endless conveyor band 26. As is evident, guide bars 27 direct the dough toward a centrally located discharge slot 29 and thus into rolling gap 6 between rollers 2.

The guide frame shown in FIGS. 4 and 5 and the second guard shield 23 may of course be used also in conjunction with the device of FIGS. 1, 2 and 3.

While the invention has been described in detail with respect to certain now preferred examples and embodiments thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A crescent roll-forming device comprising, in combination, a pair of coacting superimposed pressure rollers, feed means for feeding dough to be formed to said rollers on one side thereof for passage of the dough therethrough, a substantially horizontally traveling transport conveyor on the discharge side of the rollers, dough-stripping means having a scraping edge disposed on the discharge side of the rollers in coacting relationship with the upper one of said rollers, and a substantially rigid rolling strip extending lengthwise of said conveyor above the same spaced apart therefrom, one end of said strip being disposed adjacent to said rollers and substantially in alignment with the scraping edge of the stripping means as seen in the direction of travel of the dough on the conveyor, whereby dough discharged from the rollers is directed by the stripping means upon the conveyor and is folded and rolled as it travels between the rolling strip and the conveyor.

2. A device according to claim 1, wherein said rolling strip has a lengthwise midportion concavely curved in a crosswise direction in reference to said conveyor.

3. A device according to claim 1, wherein said rolling strip is comprised of a front part adjacent to the rollers and a rear part hinged to the front part, said rear part being fixedly mounted in reference to the conveyor and said front part being upwardly pivotal in reference to the conveyor.

4. A device according to claim 3, wherein said front part has an extension on its bottom side bridging the hinged ends of the front part and the rear part.

5. A device according to claim 4, wherein the bottom side of the front part including the extension thereof is covered with a layer of fabric.

6. A device according to claim 1 and comprising a guard shield mounted on the discharge side of said pressure rollers, said one end of the rolling strip being secured to said guard shield.

7. A device according to claim 1, wherein said conveyor is lengthwise displaceable between a position substantially in engagement with the lower one of said pressure rollers and a position spaced apart therefrom.

8. A device according to claim 1 comprising guide frame means coacting with said feed means for guiding dough traveling on the feed means to said pressure rollers for passage therebetween.

9. A device according to claim 8 and comprising a guard shield mounted on the feed side of said pressure rollers, said guide frame means being secured to said guard shield.

References Cited

UNITED STATES PATENTS

| | | | |
|---|---|---|---|
| 611,563 | 9/1898 | Corby | 107—9 |
| 649,437 | 5/1900 | Corby | 107—9 |
| 1,582,382 | 4/1926 | Collis | 107—9 |

WALTER A. SCHEEL, *Primary Examiner.*

J. SHEA, *Assistant Examiner.*